July 8, 1969  N. S. DAVIS  3,454,691

METHOD OF MAKING FIBER-REINFORCED STRUCTURES

Filed Sept. 24, 1965  Sheet 1 of 2

INVENTOR
NOAH S. DAVIS

BY
Stuart W. Wohlgemuth
ATTORNEY

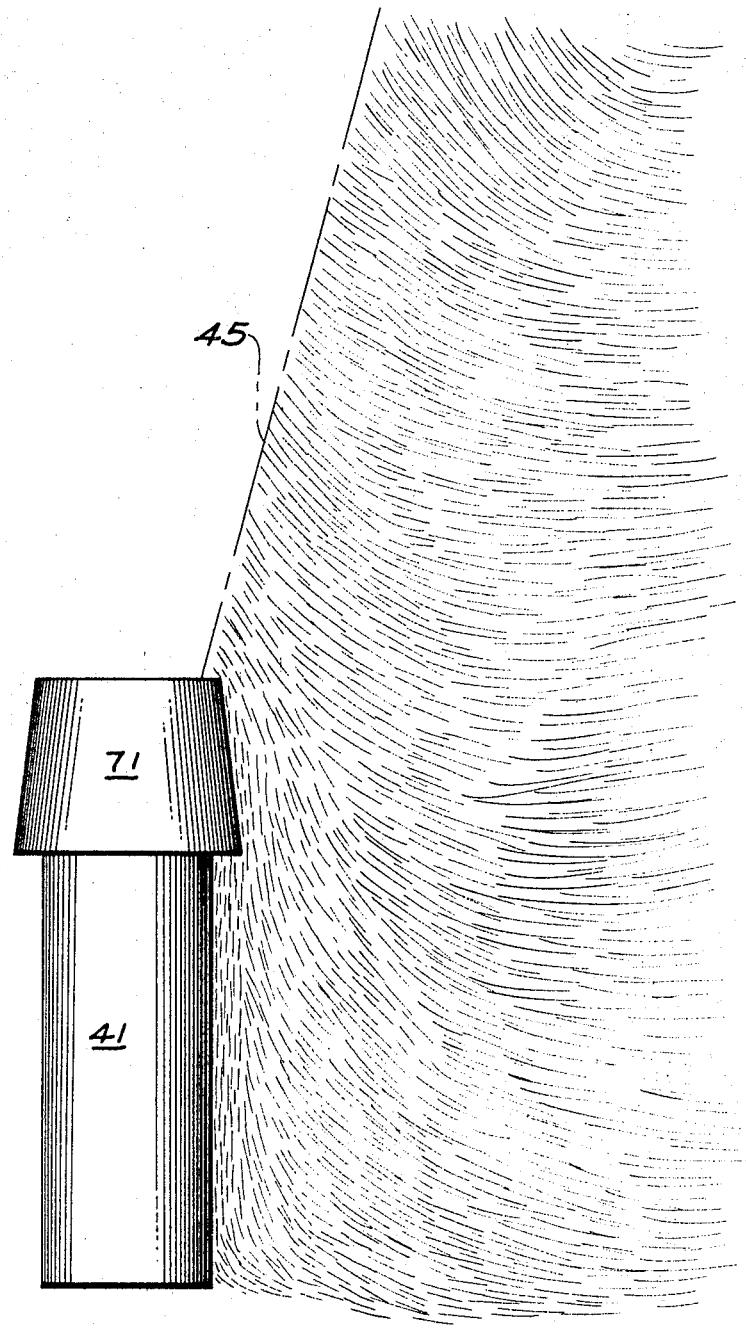

United States Patent Office 3,454,691
Patented July 8, 1969

3,454,691
METHOD OF MAKING FIBER-REINFORCED STRUCTURES
Noah S. Davis, Northridge, Calif., assignor to North American Rockwell Corporation
Filed Sept. 24, 1965, Ser. No. 490,045
Int. Cl. B29c *13/00*
U.S. Cl. 264—108          2 Claims

ABSTRACT OF THE DISCLOSURE

A process for making reinforced resinous structures wherein the improvement comprises depositing said resinous reinforcing materials on a first portion of a substrate by a flowing liquid carrier, and wherein the deposit is in a pattern parallel to the first portion and controlling the flow so as to give eddy currents building up deposits perpendicular to another portion of the substrate.

---

This invention relates to a method of making fiber-reinforced structures. More particularly, the invention is an improvement in a process for making fiber-reinforced structures utilizing a fluid suspension of the fibers to form the structure.

In co-pending application, Ser. No. 397,976 now abandoned, the same inventor, filed Sept. 21, 1964, there is disclosed a method of making fiber-reinforced resinous structures. The herein invention relates to a further improvement of the process in the co-pending application. In the prior application, short renforcing fibers were mixed in a liquid carrier solution. The fibers could be impregnated previously with a resin or the carrier itself could serve as a resinous material which ultimately will bond the fibers to each other. A porous form is provided in an enclosed housing. Fluid containing the impregnated material is directed under pressure against the porous form. The reinforcing elements are laid up normal to any openings in the form. The carrier fluid passes through the porous openings in the hollow form and flow through the center passing out thereof. Additionally, by utilizing the principle that the reinforcing elements would orient themselves normal to openings in any porous structure, screens or like apertured plate structures would be disposed about the form so that the fibers could be oriented at will in varying directions. As indicated, the porous form could be of any desired shape or plates, cylinders, cones, or any combination to approximate the final desired form or shape. The material could be laid up on the inside or outside of the perforated form. After the structure has been built up to the desired thickness, the impregnated reinforcing elements which comprise it are compressed and cured in an autoclave, for example, to a solid cohesive structure.

In the course of the development of the prior invention, an effect was discovered which forms the basis of the herein invention. In the practice of the prior invention, normally a vacuum was disposed on the side of the porous plate opposite that upon which the fibers would be laid up, so as to draw off the liquid through the plate and thus orient the fibers in the desired plane. In this prior method the flow rate or velocity of the incoming fluid carrier stream was relatively low utilizing mostly the vacuum to withdraw the fluid from the built up layer of fibers about the porous form. At the previous low flow rates utilizing most of the vacuum to remove the fluid, the buildup of fibers was not as compacted as believed could be accomplished. In order to compact the buildup of fibers in the carrying out of the process, in order to obtain a greater compaction as well as to increase the rate at which parts could be made, investigation was made of higher forming pressures. This pressure was obtained by increasing the velocity of the incoming carrier fluid with the fibers therein. However, by doing this it was found to disturb the orientation attained at low flows. It was found that an orientation of fibers could be controlled at high flow rates. Additionally, it was discovered that this control of orientation could be accomplished without the necessity of the various perforated plates described in the prior invention. Preferably, however, the herein invention utilizing high flow rates of the carrier would be used in combination with the concept of the prior invention, utilizing in part, the perforated plates, or porous surfaces. The herein invention utilizes the principle of eddy currents for the positioning of the fibers within a container. Thus in the present embodiment of the concept embraced by this invention, the fluid carrier containing the fiber elements is directed into a closed container or mold having positioned therein surfaces corresponding to the desired orientation of the fibers in the end product. By the correct positioning of the outlet for the fluid carrier, and maintaining the flow rate at a sufficient velocity, an eddy current will be set up within the container. Through the eddy current, fibers are then laid tangent to the currents induced by the surfaces contained within the mold. As indicated in the previous filed application referred to, the herein process has particular applicability in forming ablative structures particularly useful for rocket motor applications and the like. Additionally, of course, various other fiber-reinforced structures can be made. It is believed that the invention will be better understood with relation to the following detailed description and drawings in which:

Figure 1:
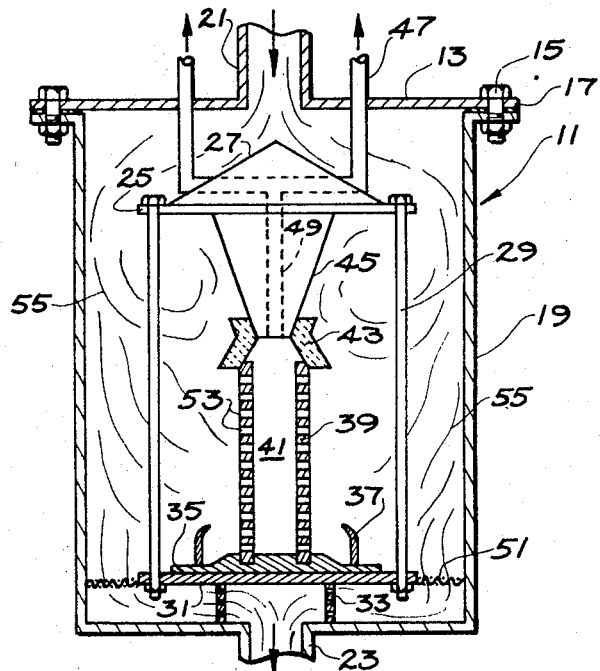
FIG. 1 is a cross-sectional view of a device used for practicing the herein invention for forming fibers for utilization in a rocket engine thrust chamber.

FIG. 4 discloses in detail the fiber orientation of a part made in accordance with the method of FIG. 1.

Reference is now had to FIG. 1 which shows the device for practicing the method of the invention in order to fabricate an ablative thrust chamber for rocket motor applications. Disclosed is an outer casing 11 having a top portion 13 which is secured by bolts 15 at a flange 17 to a cylindrical and bottom portion 19 of the housing. The top cover 13 has an inlet 21 for the admission of the carrier and the fibers to the housing. While the bottom portion 19 has an outlet 23 corresponding to the inlet 21 in the top plate. Disposed within the housing 19 is a first circular support plate 25 having a conical portion 27 resting thereon extending toward the inlet 21 such that the apex of the cone corresponds to the inlet opening of 21. A plurality of long bolts 29 secure the top plate 25 to a bottom plate 31 disposed above the exit 23. The bottom plate 31 rests additionally on a cylindrical perforated cylinder 33 disposed about the mouth of the exit 23. Resting on bottom plate 31 is the rocket engine injector plate 35. The injector plate 35 has the cylindrically shaped prong portion 37 extending upwardly from the plate which serves to secure it to the fibrous body that is formed thereabout. Additionally, extending upward from the injector plate 35 is a perforated elongated cylinder 39 which serves to define the combustion chamber area 41 of the motor formed.

Seated on the perforated cylinder 39 but not permanently affixed thereto is a throat insert 43 of a ceramic or graphitic material commonly used in rocket engine throat sections. Extending from the throat to the top plate 25 is a diverging conically shaped section 45 made of sheet metal of stainless steel, aluminum, or the liike. Preferably the conical section 45 has an outer coating of Teflon to facilitate its easy removal, as will be later explained. The conical section 45 will be tight fitted to the throat 43 so that after the curing of the part formed, it can be easily removed. As disclosed in the figure, two outlet lines 47 are disclosed as extending through a top 13 of the outer housing 11. The outlet lines 47 form a T and extend as a single line 49 into at least the throat area of the device being made and serve to carry a proportion of the carrier out of the housing as the fabrication proceeds. In the method of the invention, the carrier stream containing the fibers enters inlet 21 and then is dispersed towards the sides of the housing 11 by the conical shaped member 27 according to the flow lines shown. The initial buildup of fibers occurs towards the bottom of the housing across a screen 51 surrounding the bottom plate 31 and parallel to the perforated cylindrical section 39 or in other words normal to the apertures 53 in this perforated section. After the fibers have built up at the bottom of the device to approximately the throat section 43 due to the velocity of the incoming fluid an eddy current of circular pattern as indicated by the flow lines 55 is set up in the top half of the device above the throat area. This circular eddy current causes the fibers in the current to strike the conical section 45 at approximately a right angle. Thus, the fibers in this area will have a pattern normal to the conical surface. This is most desirable in a rocket thrust chamber since relatively high heat transfer is particularly desirable in the nozzle section of the motor, as compared to the combustion chamber area surrounding the perforated section 39 where high strength is desirable. Thus, the fibers in this area are aligned parallel to the combustion chamber so as to give higher strength yet not permitting as great a heat transfer as fibers that are perpendicular to a section such as in the exhaust nozzle area. Previous to the herein invention it was felt necessary to provide various aperture plates so as to align the fibers properly in the areas surrounding the exhaust nozzle section. Now with the high velocity stream which causes the current to flow tangential to the containing walls of the vessel and exhaust nozzle section, the desired end result can be readily accomplished. Additionally, due to the high velocity flow rates a significant compaction of the fibers will occur during this phase of the process so that the extent of compression thereafter is reduced. After the product has been sufficiently built up in the housing 11, the top thereof is removed and the top cone which is affixed thruogh the exit lines 47 is removed also. The flow rates are dictated by the size of fibers, temperature of carrier, viscosity of carrier, density of fibers, size of container, and size of inlet lines in which the part is formed. The flow rate must be sufficient to create turbulent flow in the container rather than streamline flow. The desired eddy currents can only occur at turbulent flow conditions. The remaining fibrous mass is then compacted by piston or like compression means in the container so as to sufficiently compact the fibers. Alternatively, the compacted mass can be removed from the housing and placed in a bag which is then inserted in an autoclave for compression. While the fibers are being compressed, they are heated. This heat cures the resin and sets the mixture of resin and fibers so that the final product is a hard reinforced plastic. The exit portion 45 is then removed from the final product and the perforated cylinder 39 forming the combustion chamber is heated to its melt out temperature whereby it flows out through the nozzle portion. The bagged material is machinable to a desired outer diameter for use as an ablative rocket motor, while the compressed part may be already molded to size (net molding).

The key to the operation of the method disclosed in FIG. 1 is that the rate of flow of the incoming stream 21 is so great, after the build up of fibers has reduced the open area in the mold, that eddy currents are created which swirl around the open area instead of immediately leaving the vessel through the exit lines. The fibers deposit on the inner wall of the open area, parallel to the line of flow of the eddy current. This differs from the deposition of fibers perpendicular to the line of flow which is revealed in our co-pending application.

In the latter the lower flow rates due to the vacuum on the exit lines 47 and 23 would be sufficient to draw the liquid carrier through the build up of fibers and out of the housing prior to any eddy current being established. In other words, what is happening is that the eddy current is set up due to the fact that the carrier is not immediately directed out of the vessel through the exit lines, but rather establishes itself in the eddy current pattern.

Figure 2:
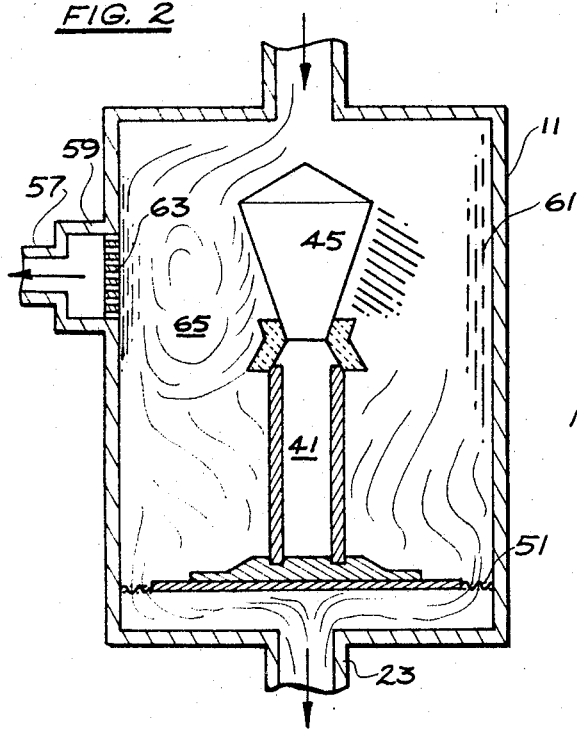
FIG. 2 is a cross-sectional view of a device of FIG. 1 showing a second embodiment of the invention.

With relation to FIG. 2 there is schematically shown the device essentially the same as that in FIG. 1 for forming an ablative thrust chamber. The details of holding the forms in place and means for opening the housing are the same as FIG. 1 and not shown. In this particular configuration the fluid can only exit at two places; at the bottom exit 23 and at a side exit 57 which is the form of an annulus 59 surrounding a portion of the housing 11, corresponding to the area adjacent the nozzle exit of the motor formed. In this particular arrangement, several layers of fiber 61 are built up parallel to the outer walls around a circumference of the motor. This is due to the effect of the screen 63 disposed in the annulus whereby the fibers align themselves parallel to the screen as the carrier fluid leaves in the exit 57. Fibers at the bottom portion of the device corresponding to the combustion chamber area 41, the eddy current 65 in a swirl pattern as shown will then be created to place the fibers essentially perpendicular to the wall 45 of the exhaust nozzle portion of the motor being formed.

Figure 3:
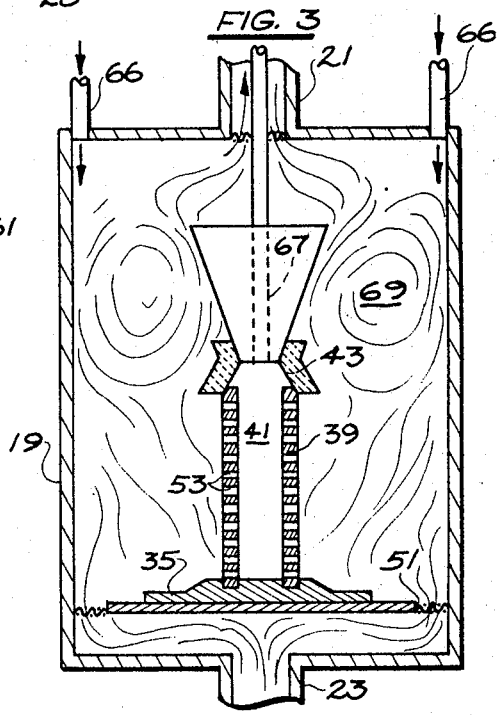
FIG. 3 shows a third embodiment of the invention using essentially the same device of FIG. 1.

FIG. 3 depicts third schematic variation of the basic idea of this invention. As in FIG. 2, details of holding the forms in place and means for opening the housing are not shown. In this particular configuration the incoming stream is admitted through multi inlet lines 66 at the top of the device and at the outer periphery thereof. The exit for the carrier fluid is the bottom line 23 and at a top 21 which had in the previous two devices served as an inlet line. As can be seen in this embodiment, the conical portion 27 above the top plate 25 is not needed since the incoming stream comes down the sides of the mold. In this embodiment the carrier flow will be directed through the screen 51 on the bottom of the device building up fibers thereat and along the perforated cylinder 39 to create the combustion chamber area of the motor. The carrier flow passing through the apertures 53 in the cylinder 39 will be directed out of the vessel through a pipe 67 extending into the throat section 43 of the device and leading out through the exit 21 as shown. After the fibers have built up in the lower end of the housing to a level approximating the throat insert 45, the eddy current effect as shown by the lines 69 will occur in the top half of the device. The resultant product will be essentially that of FIG. 1. The difference between the two methods residing in the placement of the inlet stream of the carrier.

Turning now to FIG. 4, there is shown schematically the placement of fibers in accord with the method of FIG. 1. Along the thrust chamber section 41 the fibers immediately adjacent thereto are substantially parallel to the walls due to the effect of the apertures in the melt out porous cylinder utilized. This effect is generally carried over to the throat area 71 as shown. As the fibers progress away from the combustion chamber wall, it can be seen that a slightly swirled pattern is effected. This is due to an eddy current effect. In the nozzle exit portion 45 it can be seen that the lines of fibers curve toward the nozzle such that the fibers strike the nozzle portion at approximate right angles. Once again, this is due to the pattern set up by the previous described eddy current.

The fibers utilized as well as the resinous matrix can be any of those described in the co-pending application, Ser. No. 397,976. These include, but are not limited to, silica, glass, molybdenum, mica, and the like. Thus, any fibrous material known can be used. The main objective is the displacement of the fibers according to a pre-determined pattern in a curative resinous matrix. Through the description of the invention with relation to the formation of ablative throat engines, it should be apparent that the invention relates itself to use in other applications calling for placement of fibers in matrices where a liquid carrier can be used. In many instances especially those where pre-impregnated fibers are used, the liquid carrier can be water. Additionally, other inert fluid carriers such as hydrocarbons, silicone oils, and inert gases can be used as carriers. As previously indicated, one might utilize a non-preimpregnated fiber with the resinous material serving as the main liquid carrier. The fibers, in order to have orientation should have one dimension at least twice that of another. Thus, even flat plates of material such as mica can be used. The length of the fibers would be determined only by the size of the apparatus used.

Although the invention has been described and illustrated in detail, it is to be clearly understood that the same is by way of illustration and example only and is not to be taken by way of limitation, the spirit and scope of this invention being limited only by the terms of the appended claims.

I claim:
1. The method of making reinforced resinous structures wherein the orientation of the reinforcing elements is varied and controlled throughout said structure comprising:
   mixing reinforcing elements in a fluid medium carrier,
   providing a housing having an inlet and outlet for the passage of the fluid carrier and elements,
   providing a form having first and second surface sections disposed in said housing to define the internal configuration of the sturcture to be made,
   directing said fluid carrier and elements into said housing and against said form,
   providing at least one apertured plate in the path of said carrier prior to said carrier leaving said housing whereby said reinforcing elements are retained on said form with carrier passing through said plate,
   controlling the flow of said element-containing carrier in a first volume of said housing adjacent and tangential to said first surface section whereby said elements are deposited on said first surface section in an orientation parallel thereto,
   swirling the flow of said element-containing carrier circularly in an eddy current in a second volume of said housing adjacent said second surface section whereby said elements are deposited substantially vertically on said second surface section.

2. The method of making reinforced resinous structures wherein the orientation of the reinforcing fibers is varied and controlled throughout said structures comprising
   mixing reinforcing fibers in a fluid medium carrier,
   providing a housing having an inlet and an outlet for the passage of the fluid carrier and fibers,
   providing a form having first and second surface sections disposed in said housing to define the internal configuration of the structure to be made,
   directing said fluid carrier and fibers into said housing and against said form,
   providing at least one apertured plate in the path of said carrier prior to said carrier leaving said housing whereby said reinforcing fibers are retained on said form with carrier passing through said plate,
   controlling the flow of said fiber-containing fluid in a first volume of said housing adjacent and tangential to said first surface section whereby said fibers are deposited on said first surface section in an orientation parallel thereto,
   further controlling the rate and direction of flow of said carrier in said housing such that turbulent flow is created within a second volume of said housing to produce an eddy whereby said fibers are deposited substantially vertical on said second surface section.

References Cited

UNITED STATES PATENTS

| 1,880,006 | 9/1932 | Young | 264—87 |
| 1,950,089 | 3/1934 | Morse | 264—87 |
| 3,025,195 | 3/1962 | Kozma | 264—121 |

JULIUS FROME, *Primary Examiner.*

J. R. THURLOW, *Assistant Examiner.*

U.S. Cl. X.R.

264—81, 86